Sept. 17, 1935.  R. B. MARSHALL ET AL  2,014,657
HEATER FOR HOTBEDS
Filed Jan. 2, 1931
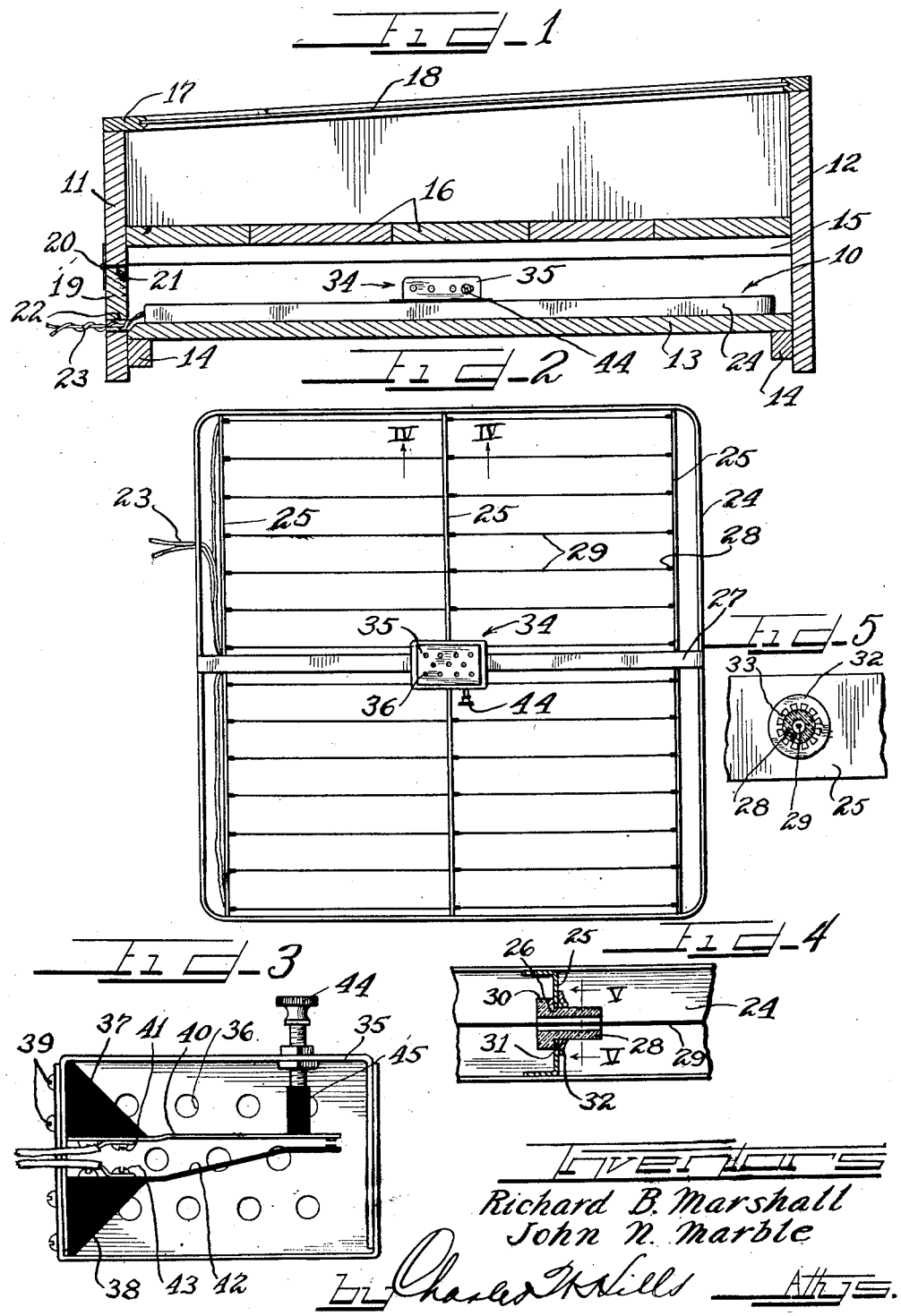
Inventors
Richard B. Marshall
John N. Marble Patented Sept. 17, 1935

2,014,657

UNITED STATES PATENT OFFICE 2,014,657

HEATER FOR HOTBEDS

Richard B. Marshall, Grosse Pointe Village, and John N. Marble, Highland Park, Mich., assignors to The Detroit Edison Company, Detroit, Mich., a corporation of New York Application January 2, 1931, Serial No. 506,048

3 Claims. (Cl. 219—19)

This invention relates to a heating device and more particularly to improvements in the construction and operation of an electric heater for stimulating plant and seed growth in hotbeds, seed germinators, propagating benches and the like.

In the use of hotbeds for germinating seeds and propagating plants, it is desirable that the compartment containing the seeds or plants should be kept at a constant temperature, this temperature varying in value for different seeds and plants. Various modes have been resorted to for heating the hotbed and maintaining its temperature at the proper value. In some instances, hot water or steam has been circulated through the hotbed and various schemes have been used for regulating the temperature. In other cases, where it has not been advisable to resort to the more complicated schemes of heating, the usual practice has been to heat the hotbed by means of the fermentation of a layer of manure which is placed on the bottom of the hotbed. The former modes of heating are objectionable in that they are usually very complicated; require the expenditure of a considerable amount of money for their installation, since the installation is usually of a permanent nature; and are relatively expensive to operate. The latter practice is objectionable in that the amount of heat generated by fermentation of the manure cannot easily be regulated.

In order to overcome these and other objections, it is an object of our invention to provide improved means whereby hotbeds, seed germinators, propagation benches and the like may be electrically heated and maintained at a proper temperature for stimulating plant and seed growth.

It is a further object of our invention to provide a portable heater that is so constructed that it may be easily transferred from one section to another of a hotbed, seed germinator or propagating bench for maintaining any desired section at a predetermined temperature.

Another object of our invention is to provide in a portable heater for hotbeds and the like improved means for anchoring the members which are utilized for insulatingly supporting the heating element.

It is also an object of this invention to provide an electric heater for hotbeds and the like, which is simple in design, economical to manufacture, efficient in operation, and which is adapted to continuously and automatically maintain the surrounding medium at a predetermined temperature.

To this end, we propose to provide a relatively flat frame structure having a heating element looped back and forth between the end members thereof and a suitable connection cord for attaching the heater to an electrical source of supply. A regulating switch, which is arranged to respond to changes of temperature of the surrounding medium, is mounted on the frame and connected in the supply circuit to the heating element. In utilizing my device for heating hotbeds and the like, the hotbed is preferably constructed with a heater compartment which is immediately below the compartment in which the plants or seeds are to be grown. This arrangement is advantageous in that the electrical heater may be easily transferred from one section of the hotbed to another section, and moreover, the heater takes up a very small amount of space and will distribute the heat uniformly and efficiently over the bottom of the upper compartment of the hot bed and maintain the temperature constant through the action of the regulating switch.

Other objects and advantages of this invention will more fully appear from the following detail description taken in connection with the accompanying drawing which illustrates a single embodiment thereof, and in whch, Figure 1 is a sectional view of a hotbed, showing a heater embodying the features of my invention applied thereto;

Figure 2 is a plan view of the heater of my invention;

Figure 3 is a plan view looking into the open side of the housing surrounding the regulating switch which shows the operative relationship of the various elements therein;

Figure 4 is an enlarged fragmentary view partly in section, showing the manner in which the insulating members for the heating element are secured in position, taken substantially on line IV—IV of Figure 2; and Figure 5 is an enlarged fragmentary elevation showing anchor means for the insulating tube which supports the heating element, taken substantially on line V—V of Figure 4.

As shown on the drawing:

In the illustrated embodiment of our invention, there is shown in Figure 1 a hotbed in which our improved heater, which is generally indicated by the numeral 10 is mounted directly below the compartment for receiving the plants or seeds to be grown.

This hotbed comprises a frame having a forward wall 11 and a rear wall 12 which should preferably be of slightly greater height than the front wall. The front and rear walls are connected by a bottom structure 13 which is supported at its ends upon bracket members 14 which are secured to the respective walls. Spaced above the bottom structure 13 and parallel thereto are members 15 which are secured at their ends and serve as joists for supporting flooring members 16 which form the bottom of the upper compartment and the top or roof of the lower compartment of the hotbed. The upper compartment is closed by means of a frame 17 having a transparent member 18 of a material such as glass secured within the confines thereof. A closure member 19 is swingably secured by a hinge 20 at its upper edge for movement into and out of an opening 21 in the forward wall 11 of the hotbed, this opening being in communication with the lower compartment. This closure is preferably notched as at 22 at its free edge to permit bringing out the connecting cord 23 of the heater to the exterior of the hotbed.

Further, in the construction of the hotbed it has been found by experience that it may be more efficiently heated if the flooring members 16 are unmatched members having their edges abutting rather than interconnected by means of tongue and groove or other interconnecting means. Also, that the bottom structure 13 may, if desired, be covered on its upper surface with building paper and a sheet of metal in order to decrease the heat losses.

The heater proper comprises a substantially rectangular frame 24 which is preferably constructed of channel members in order that the frame may be of sufficient strength. Extending between the lateral edges of the frame 24 are a plurality of transverse bracing members 25 of channel iron construction, these members being preferably placed edgewise and provided with a plurality of spaced apertures 26 throughout their length. The end members of the frame 24 and the transversely extending members 25 are further braced intermediate their ends by means of a member 27 which is secured at its ends to the frame and also at its points of intersection with the members 25.

Within each aperture of the members 25 a tubular insulating member 28 is disposed. This member serves as a support for a heating element 29 which extends through the bore thereof. One end of the member 28 is extended to form a head 30 having a shoulder 31 which abuts one side of the channel member 25. A ring shaped member or washer 32 is disposed around the other end of the member 28 and provided with inwardly projecting tongues 33 circumferentially spaced around the inner circumference of the washer 32, these tongues being arranged to make frictional engagement with the outer periphery of the tube 28. Thus, when the washer 32 is slid into engagement with the other surface of member 25 it securely holds the tube 28 within the aperture 26.

The extension cord 23 is connected to the ends of the heating element 29 through a make and break device, generally indicated by the numeral 34, which is mounted on the member 27 near the center of the heater. The elemnts comprising this device are enclosed within a housing 35 which is provided with a plurality of openings 36 so that the temperature of the surrounding medium will be the same within the housing as it is externally thereof. A pair of brackets 37 and 38 of insulating material are secured in spaced relation at one end of the housing 35 by means of screws 39. The bracket 37 serves as a support for an adjustable contact strip 40 and its terminal connection 41. The bracket 38 serves as a support for a cooperative contact strip 42 and its terminal 43, this strip being of thermostatic metal which will respond to changes in temperature in the surrounding medium. This strip is mounted so as to be deflected away from the strip 40 to interrupt the circuit to the heating element when the temperature of the surrounding medium is increased, and towards the strip 40 to close the circuit to the heating element, when the temperature of the surrounding medium is decreased. An adjusting screw 44 is threadedly supported in the frame 35 and provided at one end with an insulated portion 45 which engages the member 40. By adjusting this screw by turning it to the right or left, the member 40 is moved more closely or further away from the strip 42, thereby enabling an adjustment of the strips so as to make and break the heater circuit at a desired temperature. With this arrangement it is therefore possible to regulate the temperature at which the hotbed will be automatically maintained by the regulating switch.

It will be appreciated from the foregoing that our invention provides an electric heater for hotbeds and the like which is simple in design, economical to manufacture and efficient in operation; which may be easily moved from one section of the hotbed to another section thereof; which is provided with novel means for anchoring the members for insulatingly supporting the heating element; and which is automatically operable to maintain the hotbed at the proper temperature for stimulating plant and seed growth.

Now, it is of course to be understood that although we have described in detail the preferred embodiment of our invention, the invention is not to be thus limited but only insofar as defined by the scope and spirit of the appended claims.

We claim as our invention:

1. A heater for hotbeds or the like comprising a closed casing defining a compartment and having vertically spaced bottom and top members, the top member constituting a hot plate, heat generating means in said compartment adjacent the bottom member for heating the top member by convection, and a thermostatic control unit for said generating means located in the path of the hot air convection currents immediately adjacent the heater and spaced from the top member, whereby said control unit will energize said generating means before the temperature of the top member falls below the lower operating temperature of the unit.

2. A heater for hotbeds or the like comprising a closed casing defining a compartment and having vertically spaced bottom and top members, the top member constituting a hot plate, heat generating means in said compartment adjacent the bottom member for heating the top member by convection, and a thermostatic control unit for said generating means disposed above the same in the path of hot air convection currents and spaced below the top member, whereby said control unit will energize said generating means before the temperature of the top member fal's below the lower operating temperature of the unit.

3. A heater for hotbeds or the like comprising a closed casing defining a compartment and having vertically spaced bottom and top members, the top member constituting a hot plate, heat generating means in said compartment adjacent the bottom member for heating the top member by convection, a thermostatic control unit for said generating means located in the path of the hot air convection currents immediately adjacent the heater and spaced from the top member, whereby said control unit will energize said generating means before the temperature of the top member falls below the lower operating temperature of the unit, and door means in said compartment to enable removal and insertion of the generating means.

RICHARD B. MARSHALL.
JOHN N. MARBLE.